United States Patent
Lee et al.

(10) Patent No.: US 10,132,024 B2
(45) Date of Patent: Nov. 20, 2018

(54) CLOTHES TREATING APPARATUS

(71) Applicant: LG ELECTRONICS INC., Seoul (KR)

(72) Inventors: Sangik Lee, Seoul (KR); Kyungmun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 14/802,286

(22) Filed: Jul. 17, 2015

(65) Prior Publication Data
US 2016/0017533 A1    Jan. 21, 2016

(30) Foreign Application Priority Data
Jul. 18, 2014   (KR) .................. 10-2014-0090942

(51) Int. Cl.
| F26B 21/06 | (2006.01) |
|---|---|
| D06F 58/22 | (2006.01) |
| B01D 46/00 | (2006.01) |
| B01D 46/42 | (2006.01) |

(52) U.S. Cl.
CPC ......... D06F 58/22 (2013.01); B01D 46/0002 (2013.01); B01D 46/0065 (2013.01); B01D 46/4227 (2013.01)

(58) Field of Classification Search
CPC .......... D06F 58/22; D06F 58/00; D06F 58/20; B01D 46/0002; B01D 46/0065; B01D 46/4227; B01D 46/00; B01D 46/0039
USPC ............................... 34/82, 260, 596, 79, 480
See application file for complete search history.

(56) References Cited

U.S. PATENT DOCUMENTS

| 9,702,625 B2* | 7/2017 | Kim ................... F26B 21/003 |
|---|---|---|
| 2011/0271543 A1* | 11/2011 | Kim ................... D06F 58/22 34/90 |
| 2013/0145638 A1* | 6/2013 | Kim ................... F26B 21/003 34/82 |

FOREIGN PATENT DOCUMENTS

| CN | 101280509 | 10/2008 |
|---|---|---|
| CN | 201826155 | 5/2011 |
| CN | 102884244 | 1/2013 |
| EP | 2365122 B1 | 10/2012 |
| KR | 2012008645 A | 2/2012 |

OTHER PUBLICATIONS

Chinese Office Action in Chinese Application No. 201510423517.6, dated Dec. 30, 2016, 15 pages (with English translation).
(Continued)

*Primary Examiner* — John McCormack
(74) *Attorney, Agent, or Firm* — Fish & Richardson P.C.

(57) ABSTRACT

A clothes treating apparatus includes a reception unit for receiving clothes, a discharge duct for guiding air coming from an interior of the reception unit to the outside, a filter unit including a frame that is detachably inserted into the discharge duct and a filter provided in the for filtering air, and an attachment unit to detachably couple the filter unit to the discharge duct. The attachment unit includes a body provided in the frame and configured to rotate to allow coupling between the filter unit and the discharge duct, and a coupling part located at one side of the body for selectively coupling to the discharge duct through a through hole in the frame. The body defines a body through hole passing through the body, the body through hole being configured to prevent foreign substances from remaining.

20 Claims, 9 Drawing Sheets

(56) References Cited

OTHER PUBLICATIONS

Extended European Search Report issued in European Application No. 15177261.3 dated Dec. 11, 2015, 6 pages.

* cited by examiner

【Figure 1】
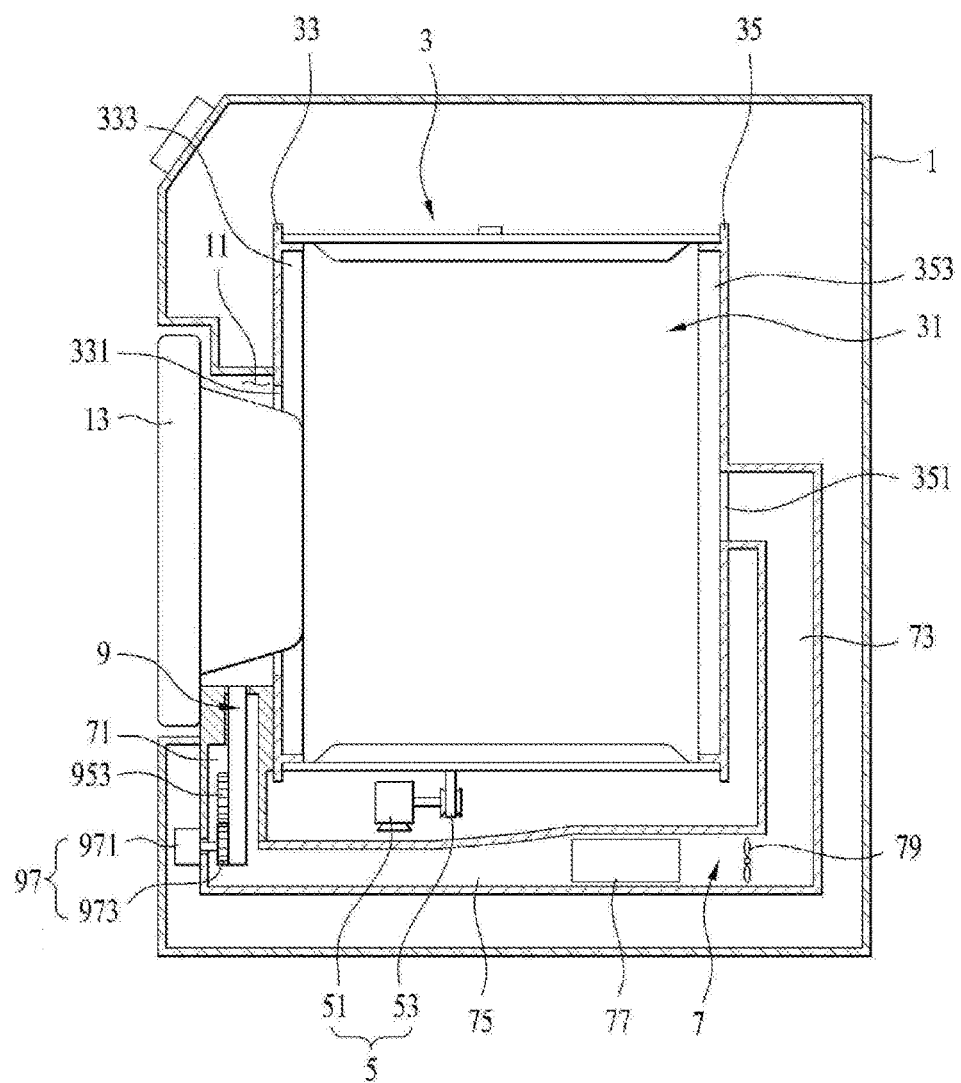

【Figure 2A】
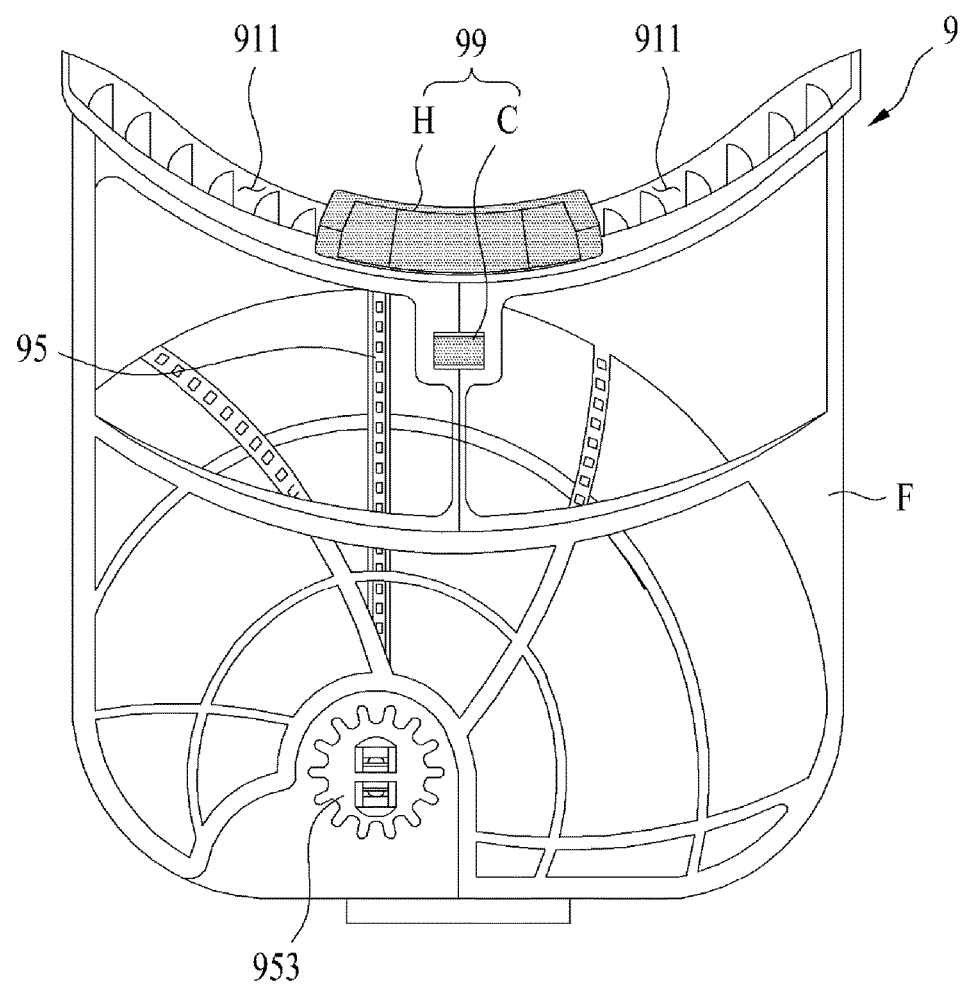

[Figure 2B]
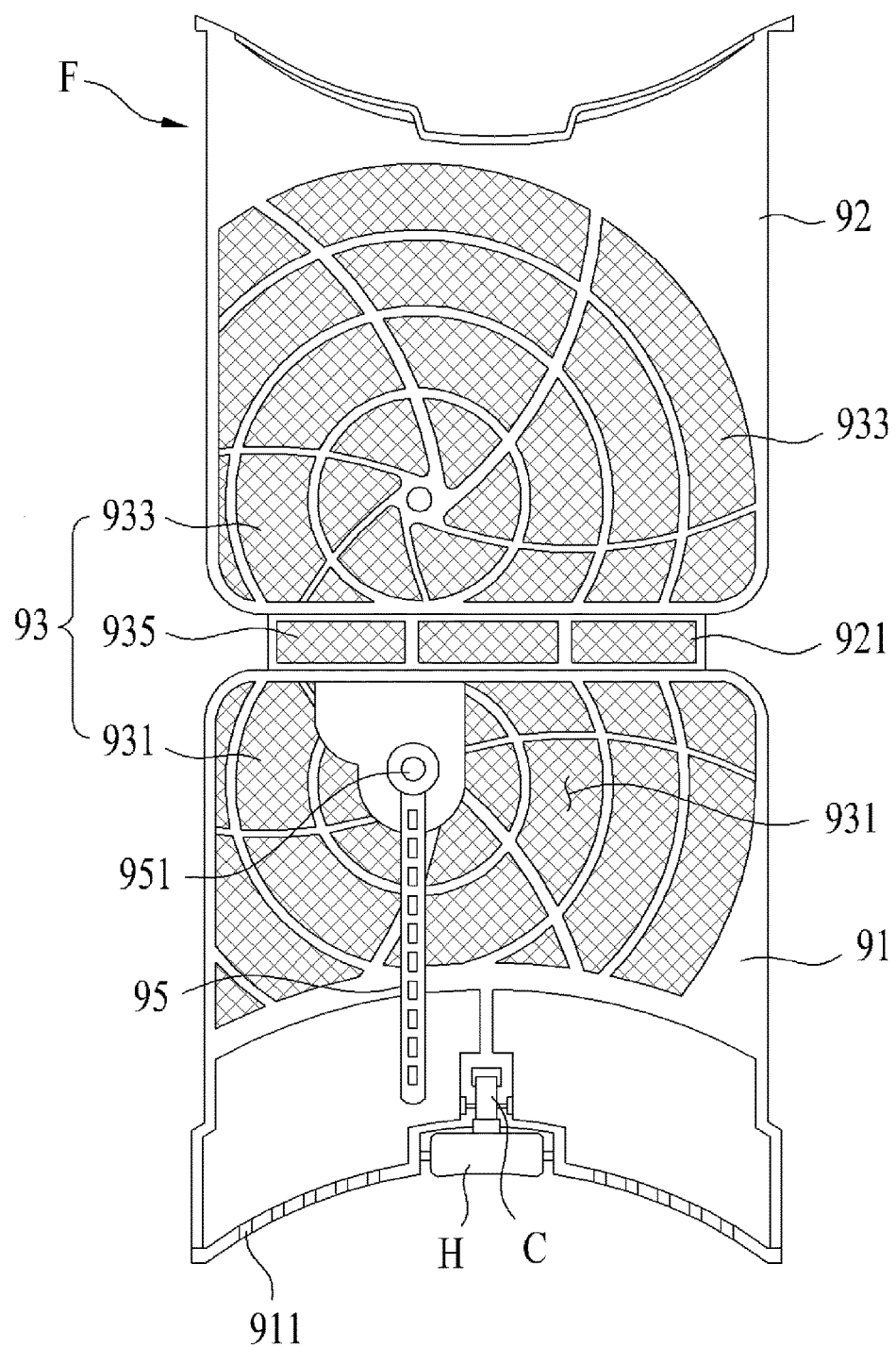

【Figure 3A】
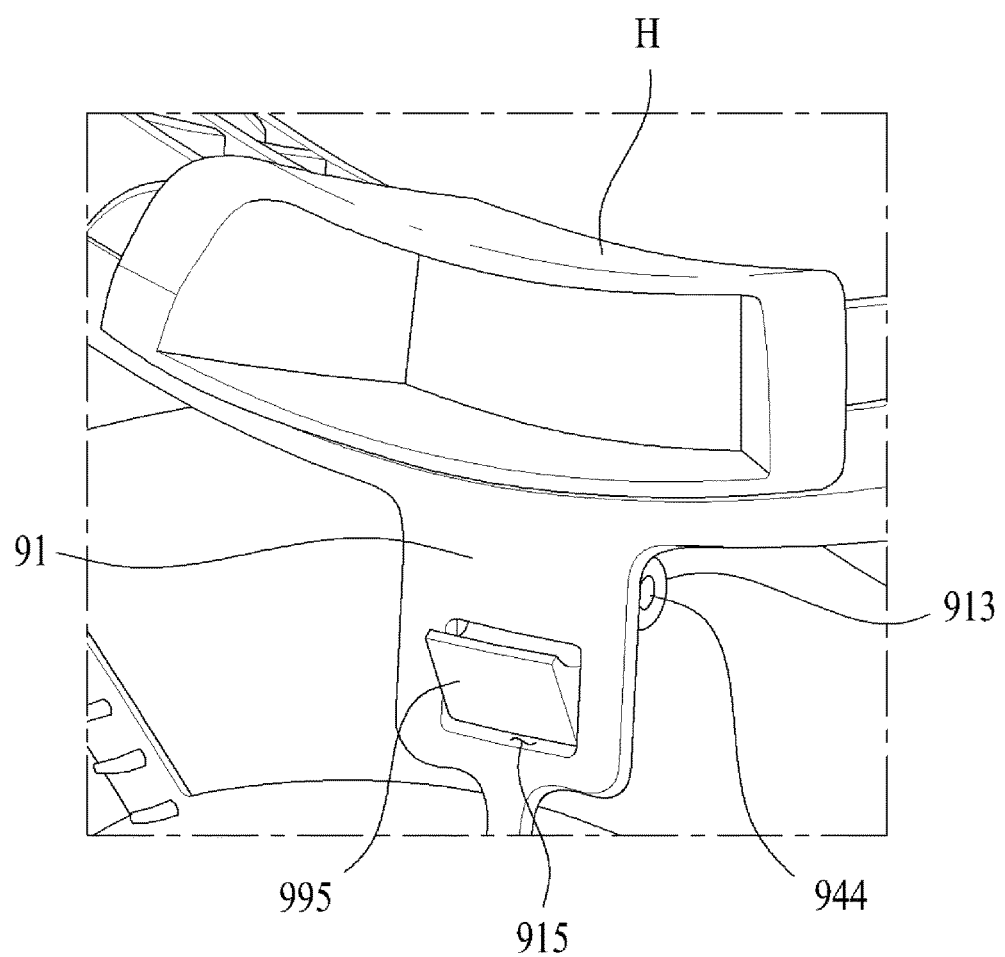

【Figure 3B】
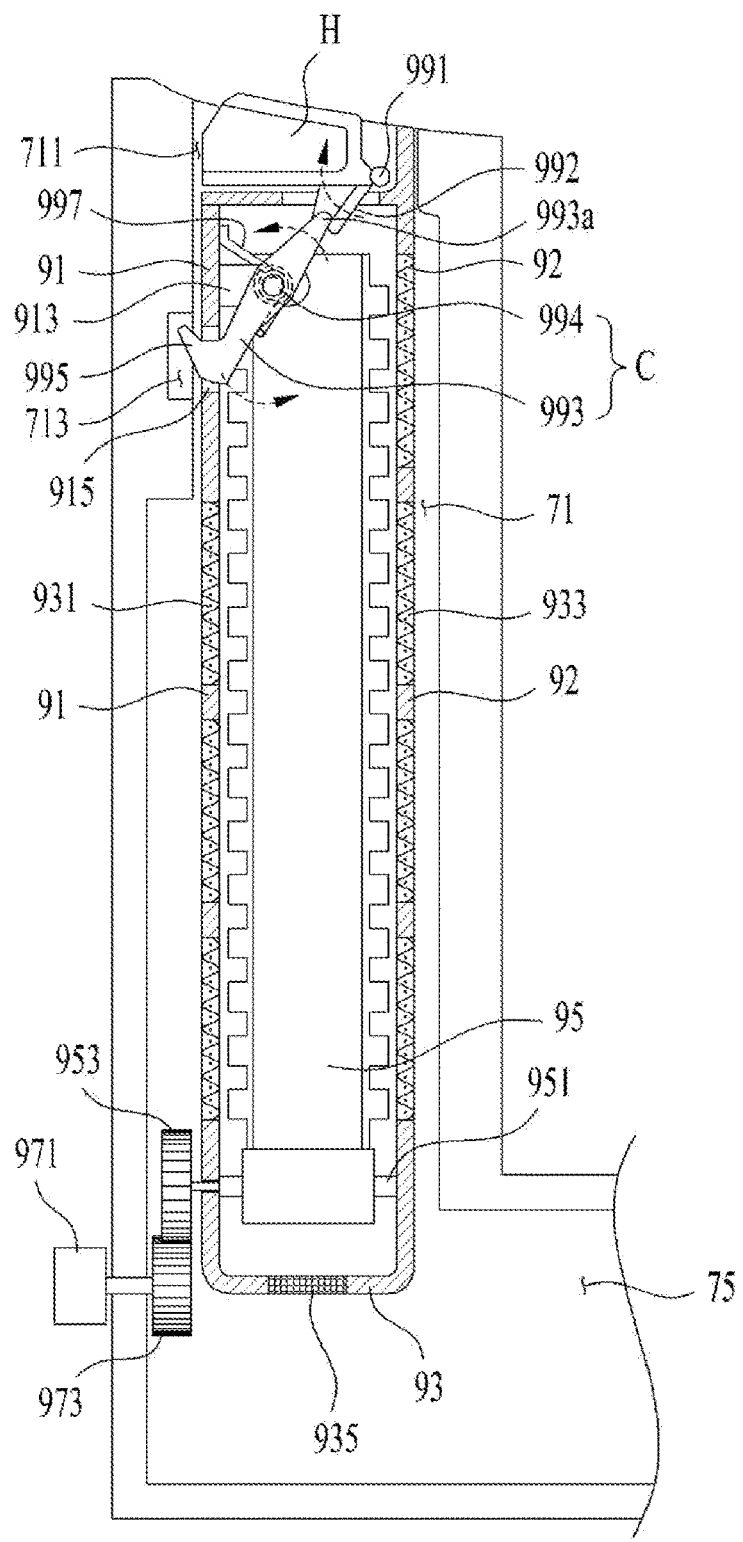

【Figure 4A】
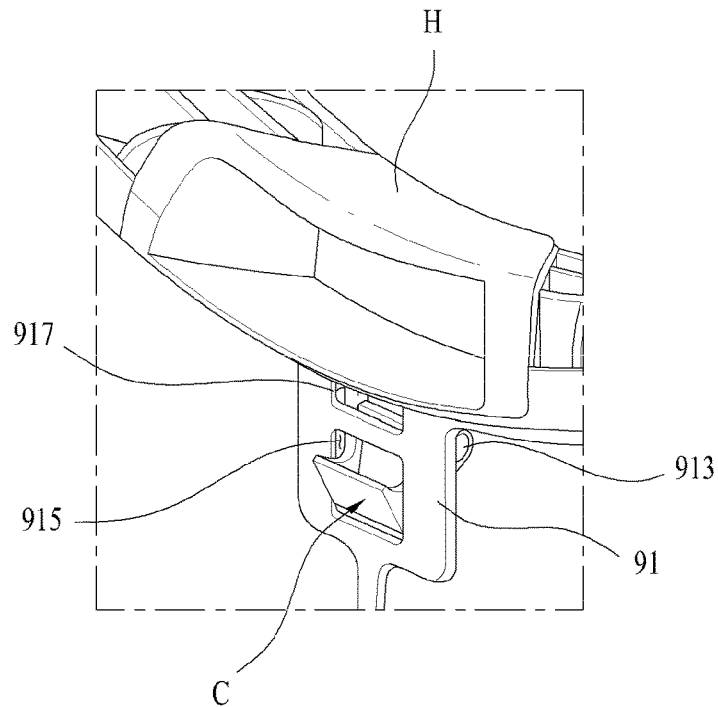
【Figure 4B】
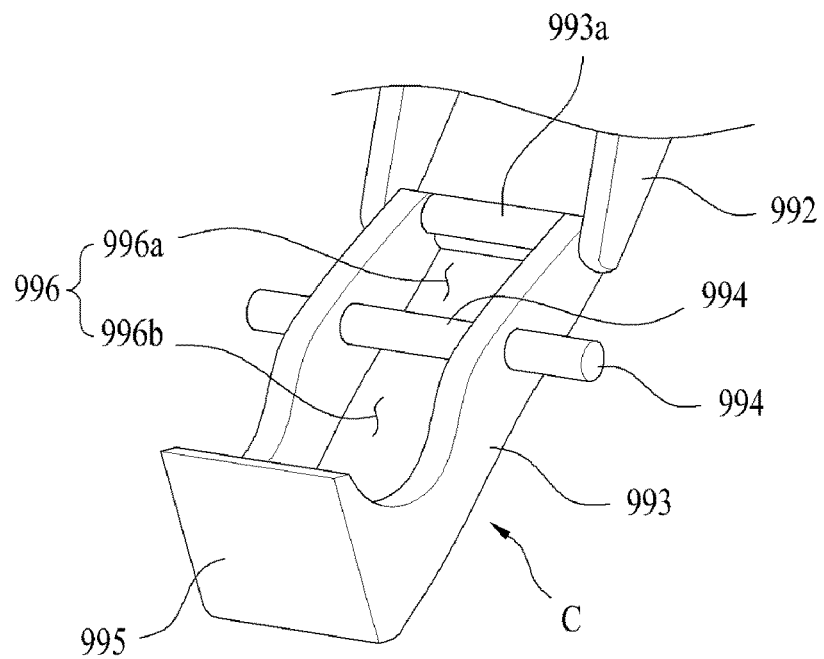

【Figure 5A】
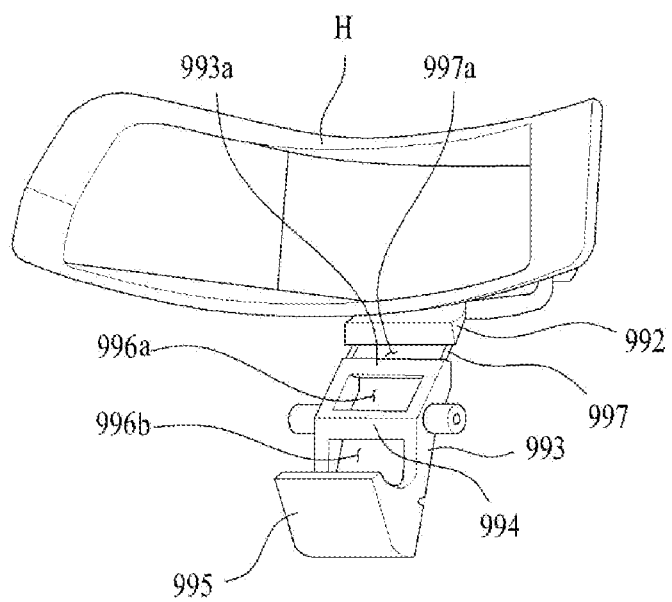
【Figure 5B】
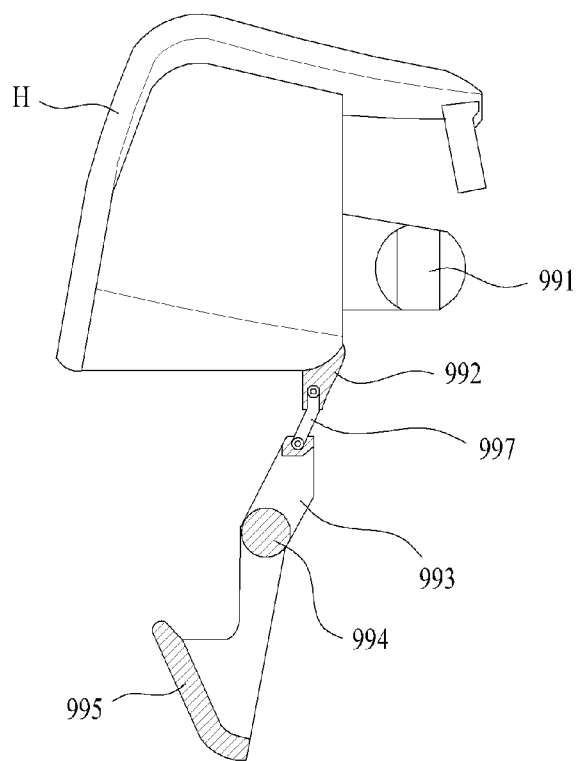

【Figure 6A】
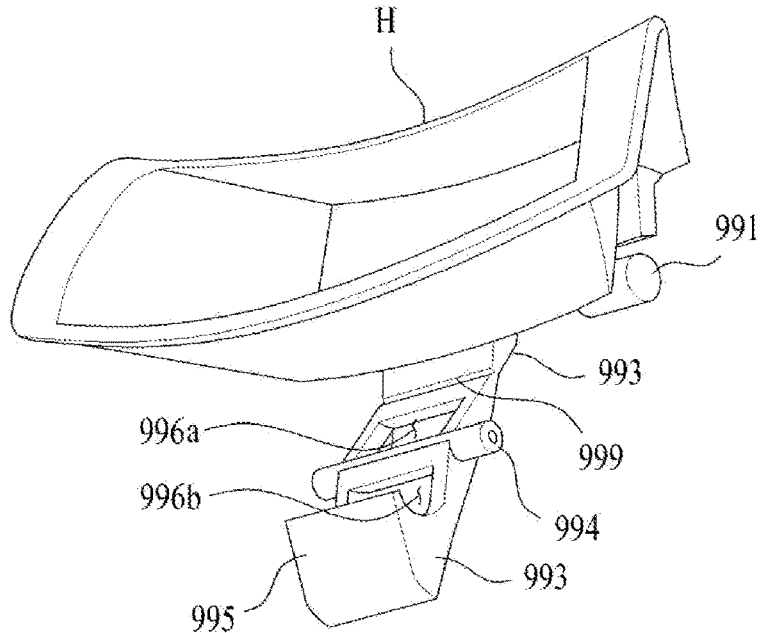
【Figure 6B】
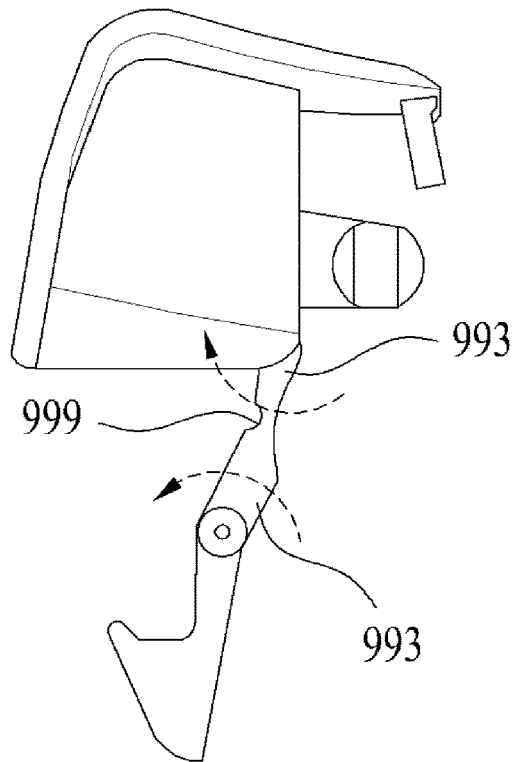

[Figure 6C]
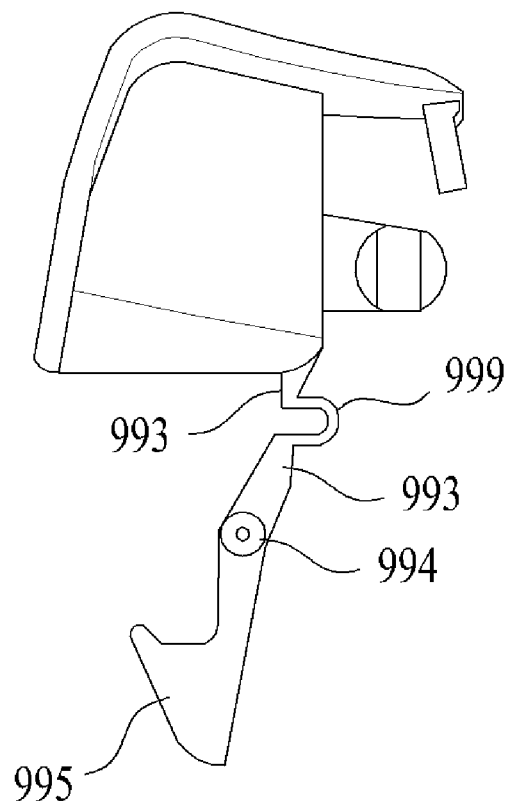

CLOTHES TREATING APPARATUS

This application claims the benefit of Korean Patent Application No. 10-2014-0090942 filed Jul. 18, 2014, which is hereby incorporated by reference as if fully set forth herein.

FIELD

The present disclosure relates to a clothes treating apparatus.

BACKGROUND

In general, clothes treating apparatuses are home appliances for washing, drying, or in some cases both washing and drying clothes, and include washing machines, dryers, and all-in-one washer/dryers.

Clothes treating apparatuses for drying clothes supply air at a high temperature (e.g. hot air) to the clothes, and may be classified as an exhaust-type clothes treating apparatus or a circulation-type (condensation-type) clothes treating apparatus according to the manner of air flow.

The circulation-type clothes treating apparatus can dehumidify and heat air discharged from a reception unit and then re-supply the air to the reception unit when the air in a reception unit, which holds clothes, is circulated. The exhaust-type clothes treating apparatus can exhaust air discharged from a reception unit to the outside without circulation when heated air is supplied to the reception unit.

In some cases, a clothes treating apparatus for drying clothes may need to remove foreign substances, such as lint, from air discharged from a reception unit.

In the case of a circulation-type clothes treating apparatus, air discharged from a reception unit is dehumidified and heated by a heat exchanger and then the heated air is re-supplied to the reception unit. If foreign substances are not removed from the air discharged from the reception unit, the foreign substances can accumulate in the heat exchanger and lower heat exchange efficiency.

Further, in the case of an exhaust-type clothes treating apparatus, if air in a reception unit is exhausted without filtration, lint or dust included in the exhausted air can be supplied to the home in which the clothes treating apparatus is installed.

Therefore, in a clothes treating apparatus for drying clothes, air discharged from a reception unit is typically filtered.

SUMMARY

According to one aspect, a clothes treating apparatus includes a reception unit configured to receive clothes, a discharge duct configured to guide air coming from an interior of the reception unit to an outside of the reception unit, a filter unit including a frame that is configured to be detachably inserted into the discharge duct and a filter provided in the frame that is configured to filter air, and an attachment unit configured to detachably couple the filter unit to the discharge duct. The attachment unit includes a body provided in the frame and configured to rotate to thereby allow coupling between the filter unit and the discharge duct, and a coupling part located at one side of the body and configured to be selectively coupled to the discharge duct through a through hole that is defined in the frame. The body defines a body through hole passing through the body, the body through hole being configured to prevent foreign substances from remaining in a space between the body and the through hole.

Implementations according to this aspect may include one or more of the following features. For example, the attachment unit may further include a rotary shaft configured to rotatably couple the body to the frame, and the body through hole may include at least one of a lower through hole located between the rotary shaft and the coupling part or an upper through hole located between the rotary shaft and a free end of the body opposite the coupling part. The filter unit may further include an elastic support part configured to apply a force to the body so as to maintain the state of the coupling part inserted into the through hole, and a handle configured to apply pressure to the free end of the body so as to withdraw the coupling part from the through hole. The elastic support part may include an elastic body connecting the free end of the body to the handle. The elastic body may define a support part through hole located between the free end of the body and the handle to provide a moving path for foreign substances. The filter unit may further include a handle configured to rotate the free end of the body to withdraw the coupling part from the through hole, and the handle may be fixed to the free end of the body. The body may include a bending part located between the rotary shaft and the handle and may have a concave shape. The frame may include a second through hole located above the through hole to communicate the inside of the frame with the outside of the frame. The filter unit may further include a scraper provided within the frame and configured to reciprocate within the filter unit to thereby separate foreign substances remaining on an interior surface of the filter from the filter. The attachment unit may be located within a rotation region of the scraper. The clothes treating apparatus may further include a shaft passing through the frame, the scraper being fixed to the shaft, a driven gear fixed to the shaft and located externally of the frame, a driving gear located within the discharge duct and configured to couple to and drive the driven gear, and a motor located within the discharge duct and configured to rotate the driving gear.

According to another aspect, a filter assembly for a clothes treating apparatus includes a filter unit including a frame that is configured to be detachably inserted into a discharge duct of the clothes treating apparatus and a filter provided in the frame that is configured to filter air, and an attachment unit configured to detachably couple the filter unit to the discharge duct. The attachment unit includes a body provided in the frame and configured to rotate to thereby allow coupling between the filter unit and the discharge duct, and a coupling part located at one side of the body and configured to be selectively coupled to the discharge duct through a through hole that is defined in the frame. The body defines a body through hole passing through the body, the body through hole being configured to prevent foreign substances from remaining in a space between the body and the through hole.

Implementations according to this aspect may include one or more of the following features. For example, the attachment unit may further include a rotary shaft configured to rotatably couple the body to the frame, and the body through hole may include at least one of a lower through hole located between the rotary shaft and the coupling part or an upper through hole located between the rotary shaft and a free end of the body opposite the coupling part. The filter unit may further include an elastic support part configured to apply a force to the body so as to maintain the state of the coupling part inserted into the through hole, and a handle configured to apply pressure to the free end of the body so as to withdraw the coupling part from the through hole. The elastic support part may include an elastic body connecting the free end of the body to the handle. The elastic body may define a support part through hole located between the free end of the body and the handle to provide a moving path for foreign substances. The filter unit may further include a handle configured to rotate the free end of the body to withdraw the coupling part from the through hole, and the handle may be fixed to the free end of the body. The body may include a bending part located between the rotary shaft and the handle and may have a concave shape. The frame may include a second through hole located above the through hole to communicate the inside of the frame with the outside of the frame. The filter unit may further include a scraper provided within the frame and configured to reciprocate within the filter unit to thereby separate foreign substances remaining on an interior surface of the filter from the filter. The attachment unit may be located within a rotation region of the scraper.

BRIEF DESCRIPTION OF THE DRAWINGS

FIG. 1 is a longitudinal-sectional view exemplarily illustrating a clothes treating apparatus in accordance with the present application;

FIGS. 2A, 2B, 3A, and 3B are various views illustrating an example filter unit in accordance with the present application;

FIGS. 4A and 4B are views illustrating an example attachment unit provided on a filter unit in accordance with one implementation of the present application;

FIGS. 5A and 5B are views illustrating an example attachment unit provided on a filter unit in accordance with another implementation of the present application; and FIGS. 6A to 6C are views illustrating an example attachment unit provided on a filter unit in accordance with yet another implementation of the present application.

DETAILED DESCRIPTION

Reference will now be made in detail to implementations of the present disclosure, examples of which are illustrated in the accompanying drawings. A configuration or control method which will be described below is only to describe implementations of the present application but does not limit the scope of the application. In the drawings, the same or similar elements are denoted by the same reference numerals even though they are depicted in different drawings.

As exemplarily shown in FIG. 1, a clothes treating apparatus 100 in accordance with the present application includes a cabinet 1, a reception unit 3 provided within the cabinet 1 and having a space to receive clothes (e.g., laundry to be washed or laundry to be dried), an air supply unit 7 to discharge air in the reception unit 3 to the outside of the reception unit 3, and a filter unit 9 provided within the air supply unit 7 to filter the air discharged from the reception unit 3.

An opening 11 and a door 13 to open and close the opening 11 are provided on the cabinet 1, and the inlet 911 communicates with the reception unit 3. Therefore, a user may supply clothes to the reception unit 3 through the opening 11 and take clothes within the reception unit 3 out of the cabinet 1.

If the clothes treating apparatus 100 in accordance with the present application is an apparatus only for drying clothes, the reception unit 3 may include only a drum 31 provided within the cabinet 1 so as to be rotatable.

In such cases, the drum 31 may have a cylindrical shape, the front and rear surfaces of which are open, and may be supported by a front support unit 33 and a rear support unit 35 fixed to the inside of the cabinet 1.

The front support unit 33 may include a drum opening 331 communicating with the opening 11 and a front flange 333 supporting the front surface of the drum 31. The rear support unit 35 may include a communication hole 351, through which air is introduced into the drum 31, and a rear flange 353 supporting the rear surface of the drum 31.

The drum 31 supported by the above-described front support unit 33 and rear support unit 35 can be rotated using a drum driving unit 5, and the drum driving unit 5 may include a drum motor 51 and a power transmission unit 53 to transmit power supplied from the drum motor 51 to the drum 31. FIG. 1 exemplarily illustrates the power transmission unit 53 as including a belt connecting the circumferential surface of the drum 31 to a rotary shaft of the drum motor 51. However, other driving mechanisms and methods may be used.

The air supply unit 7 for supplying air to the reception unit 3 may include a discharge duct 71 to discharge air within the drum 31, a supply duct 73 connected to the communication hole 351 to supply air to the drum 31, and a connection duct 75 including a heat exchanger 77 and a fan 79.

As exemplarily shown in FIG. 1, if the clothes treating apparatus 100 in accordance with the present application is a circulation-type clothes treating apparatus, the connection duct 75 should be provided so as to connect the discharge duct 71 and the supply duct 73 to each other.

Here, the fan 79 can circulate air within the reception unit 3 along the discharge duct 71, the connection duct 75 and the supply duct 73, and the heat exchanger 77 can dehumidify and heat air introduced into the discharge duct 71.

Alternatively, if the clothes treating apparatus 100 in accordance with the present application is an exhaust-type clothes treating apparatus, the connection duct 75 may be connected only to the supply duct 73 and the discharge duct 71 may guide air discharged from the reception unit 3 to the outside of the cabinet 1.

Therefore, when air is supplied to the inside of the reception unit 3 by the fan 79 provided in the connection duct 75 (if the connection duct 75 includes the fan 79) or when air within the reception unit 3 is discharged (if the discharge duct 71 includes a fan), air within the cabinet 1 is supplied to the reception unit 3 via the heat exchanger 77 and the supply duct 73 and the air supplied to the reception unit 3 exchanges heat with clothes and is then discharged to the outside of the cabinet 1 through the discharge duct 71.

The filter unit 9 to filter air discharged from the reception unit 3 is shown provided within the air supply unit 7.

If the clothes treating apparatus 100 in accordance with the present application is a circulation-type clothes treating apparatus, the filter unit 9 may be detachably provided in the discharge duct 71. If the discharge duct 71 is located under the opening 11, a user may easily mount the filter unit 9 in the discharge duct 71.

However, if the clothes treating apparatus 100 in accordance with the present application is an exhaust-type clothes treating apparatus, the filter unit 9 may be detachably provided in the discharge duct 71 or may be provided in the connection duct 75 to filter air supplied to the heat exchanger 77.

Hereinafter, the filter unit 9 in accordance with the present application will be described with reference to FIGS. 2A and 2B.

The filter unit 9 in accordance with the present application may include a frame F inserted into an insertion hole 711 (with reference to FIGS. 3A and 3B) provided on the discharge duct 71 and a filter 93 provided in the frame F to filter air introduced into the frame F.

The frame F may include a first frame part 91 and a second frame part 92 which are opposite each other and the first frame part 91 and the second frame part 92 may be foldable through a frame connection part 921. Due to such configuration, a user may remove foreign substances, gathered in the frame F, from the inside of the frame F.

Inlets 911 through which air discharged from the reception unit 3 is introduced into the frame F may be provided on the upper surface of the frame F. FIG. 2 exemplarily illustrates the inlets 911 as being formed on the upper surface of the first frame part 91.

Therefore, when the filter unit 9 is inserted into the discharge duct 71, the inlets 911 are located within the insertion hole 711 of the discharge duct 71 and, thus, air discharged from the reception unit 3 may be supplied to the inside of the frame F through the inlets 911.

The filter 93 may include a first filter part 931 provided on the first frame part 91 and a second filter part 933 provided on the second frame part 92. The reason why the first filter part 931 and the second filter part 933 are disposed opposite each other is to ensure that a sufficient amount of air is filtered by the filter unit 9.

In order to increase the amount of air filtered by the filter unit 9, the filter 93 may further include a third filter part 935 provided on the frame connection part 921.

Further, the filter unit 9 in accordance with the present application may further include a scraper 95 to separate foreign substances remaining in the filter 93 from the filter 93.

The scraper 95 may be provided in any shape that allows it to separate foreign substances from the surface of the filter 93. For example, FIGS. 2A and 2B illustrate the scraper 95 as having a bar shape that contacts the surfaces of the first filter part 931 and the second filter part 933.

The scraper 95 may be provided so as to be rotatable within the frame F, as exemplarily shown in FIGS. 3A and 3B. In such case, the filter unit 9 may further include a shaft 951 provided so as to be rotatable within the frame F and configured such that the scraper 95 is fixed to the shaft 951, a driven gear 953 provided at the outside of the frame F and fixed to the shaft 951, and a driving unit 97 provided on the discharge duct 71 to rotate the driven gear 953.

The driving unit 97 may include a motor 971 fixed to the outside of the discharge duct 71 and a driving gear 973 located within the discharge duct 71 and rotated by the motor 971. Therefore, the driving gear 973 and the driven gear 953 may be connected to each other only if the filter unit 9 is inserted into the discharge duct 71.

Since the driving gear 973 and the driven gear 953 are connected to each other or disconnected from each other according to whether or not the filter unit 9 is inserted into the discharge duct 71, the filter unit 9 may be withdrawn from the discharge duct 71 while the driving gear 973 is being rotated. In order to prevent this from happening, a fixing unit 99 may be provided on the filter unit 9 to detachably fix the frame F to the discharge duct 71.

The fixing unit 99 may include only an attachment unit C, provided on the frame F to combine the frame R with the discharge duct 71, or may include the attachment unit C and a handle H for operating the attachment unit C. Hereinafter, the case in that the fixing unit 99 includes the attachment unit C and the handle H (refer to FIGS. 3A and 3B) will be described.

The attachment unit C may include a body 993, provided within the frame F so as to be rotatable, and a coupling part 995 protruding from the body 993 and inserted into a through hole 915 provided in the frame F, and the handle H may be provided on the frame F so as to be rotatable and apply pressure to the free end 993a of the body 993 (the other end of the body 993 that is not provided with the coupling part 995).

Here, the body 993 of the attachment unit C is combined with the frame F so as to be rotatable through a rotary shaft 994, and the rotary shaft 994 is supported by a shaft support part 913 provided on the frame F.

Further, an elastic support part 997 may be provided on the attachment unit C. The elastic support part 997 applies pressure the body 993 so that the state of the coupling part 995 inserted into the through hole 915 of the frame F is maintained, as long as no external force is input to the free end 993a of the body 993 (as long as the handle H does not apply pressure to the free end).

FIGS. 3A and 3B exemplarily illustrate the case in which the elastic support part 997 is wound on the rotary shaft 994 such that one end of the elastic support part 997 contacts the frame F and the other end of the elastic support part 997 applies pressure to the coupling part 995 in the direction of the frame F.

The handle H may have any structure which may apply pressure to the free end 993a of the body 993, and FIG. 3 illustrates the handle H as including a handle shaft 991 to combine the handle H with the frame F so as to be rotatable and a body support part 992 contacting the free end 993a of the body 993.

Because the state of the coupling part 995 of the fixing unit 99 having the above-described structure, when it is inserted into the through hole 915, is maintained by the elastic support part 997, the coupling part 995 is combined with a fastening part 713 provided on the discharge duct 71 only when a user inserts the frame F into the discharge duct 71. Therefore, withdrawal of the frame F from the discharge duct 71 may be prevented even if the driving gear 973 transmits power to the driven gear 953 by the driving unit 97.

Since the rotary shaft 994 of the filter unit 9 is located between the coupling part 995 and the free end 993a and the handle H is provided to apply pressure to the free end 993a located above the rotary shaft 994 of the handle H, when a user rotates the handle H, the coupling part 995 moves in a direction of being separated from the fastening part 713. When the coupling part 995 is separated from the fastening part 713, the user may separate the filter unit 9 from the discharge duct 71.

However, foreign substances may remain in a space between the body 993 and the through hole 915 of the above-described filter unit 9. The reason for this is that a space between the body 993 and the frame F is narrow and the elastic support part 997 is provided at the rotary shaft 994 connecting the body 993 to the frame F.

That is, when foreign substances introduced into the space between the body 993 and the frame F are caught by the elastic support part 997, it may be difficult to discharge the foreign substances to the outside of the space formed between the body 993 and the frame F.

As described above, the scraper 95 provided within the frame F separates foreign substances remaining on the surface of the filter 93 from the filter 93 using power supplied from the driving unit 97 and moves the separated foreign substances to the bottom surface of the frame F (the surface of the frame F on which the frame connection part 921 is located). Further, in order to maximize the filtration capacity of the filter unit 9, the area of the filter 93 needs to be maximized and, thus, the attachment unit C may be located within a rotation region of the scraper 95. In this case, since foreign substances separated from the filter 93 by the scraper 95 pass through the attachment unit C, a possibility of accumulating foreign substances in the space between the body 993 and the through hole 915 may be increased.

When foreign substances accumulate in the space between the body 993 and the through hole 915, the attachment unit C may not operate properly. Therefore, the attachment unit C in accordance with the present application may further include a body through hole 996 passing through the body 993.

As exemplarily shown in FIGS. 4A and 4B, the body through hole 996 passes through the body 993 and can discharge foreign substances, introduced into the space formed between the body 993 and the through hole 915, to the outside of the space formed between the body 993 and the through hole 915.

The body through hole 996 may include an upper through hole 996a located above the rotary shaft 994, or may include the upper through hole 996a and a lower through hole 996b located below the rotary shaft 994.

When the body through hole 996 is formed through the body 993, as described above, the scraper 95 may move foreign substances located in the space between the body 993 and the through hole 915 while passing through the body through hole 996.

That is, when the scraper 95 passes by the body through hole 996, the scraper 95 may move foreign substances, located in the space between the body 993 and the through hole 915, to the bottom surface of the frame F through both side surfaces of the body 993, and further drop the foreign substances to the bottom surface of the frame F through the body through hole 996 according to circumstances.

Therefore, the fixing unit 99 in accordance with this implementation may prevent foreign substances from accumulating in the space between the body 993 and the through hole 915 of the attachment unit.

If foreign substances accumulate between the body 993 and the through hole 915 in spite of the presence of the body through hole 996, the frame F may include a second through hole 917 located above the through hole 915 so that a user may remove the foreign substances.

The second through hole 917 passes through the frame F and, thereby, a user may withdraw foreign substances located between the body 993 and the through hole 915 to the outside of the frame F. Further, when a bar is inserted into the second through hole 917, the user may move the foreign substances to the inside of the frame F through the body through hole 996.

FIGS. 5A and 5B illustrate an attachment unit C in accordance with another implementation of the present application. This implementation is distinguished from the implementation shown in FIGS. 4A and 4B in terms of the structure of an elastic support part 997.

As described above, when the elastic support part 997 is located on the rotary shaft 994 of the body 993, a possibility of accumulating foreign substances in the space between the body 993 and the through hole 915 may be increased. Therefore, in this implementation, accumulation of foreign substances in the space between the body 993 and the through hole 915 may be prevented by changing the position of the elastic support part 997.

That is, the elastic support part 997 in accordance with this implementation includes an elastic body connecting the free end 993a of the body 993 to the body support part 992 of the handle H. The elastic body may be formed of any material (metal, plastic, rubber or the like) which may provide elastic force, to insert the coupling part 995 into the through hole 915, to the body 993.

However, the elastic body may include a support part through hole 997a located between the free end 993a of the body 993 and the handle H. This serves to discharge foreign substances through the support part through hole 997a.

FIGS. 6A to 6C illustrate an attachment unit C in accordance with yet another implementation of the present application. The attachment unit C in accordance with this implementation is provided integrally with the handle H.

In this case, the body 993 may include a bending part 999 located between the rotary shaft 994 and the handle H and formed by bending the surface of the body 993 in a concave shape.

That is, the bending part 999 may have any shape, as long as the rotating direction of the handle H and the rotating direction of the body 993 located above the rotary shaft 944 based on the bending part 999, are opposite to each other when the handle H is rotated.

Although the above-described implementations illustrate the clothes treating apparatus 100 only for drying clothes, the clothes treating apparatus 100 of the present application may be provided so as to wash clothes as well as dry clothes.

In such case, the reception unit 3 may include a tube provided within the cabinet 1 to store washing water and a drum 31 provided within the tub.

Further, a water supply unit to supply washing water to the tub and a drain unit to discharge washing water stored in the tub to the outside of the cabinet 1 may be further provided within the cabinet 1.

In some cases, the tub includes a tub opening corresponding to the opening 11, and the drum 31 is provided within the tub so as to be rotatable and has cylindrical shape including a drum opening corresponding to the tub opening. However, the front support unit 33 and the rear support unit 35 of the clothes treating apparatus 100 only for drying clothes may be omitted.

The discharge duct 71 of the air supply unit 7 may be provided to discharge air within the tub to the outside of the tub, and the supply duct 73 may be provided to supply air to the inside of the tub. However, the connection duct 75 may be provided to connect the discharge duct 71 and the supply duct 73 to each other, or may be connected only to the supply duct 73, according to the drying method. The characteristics of the connection duct 75 according to the drying method have been described above, and a detailed description thereof will thus be omitted.

As is apparent from the above description, the present application provides a clothes treating apparatus having a filter unit which may remove foreign substances from air discharged from a reception unit to receive clothes.

Further, the present application provides a clothes treating apparatus having a filter unit which may be automatically cleaned to prevent drying efficiency from being reduced.

Moreover, the present application provides a clothes treating apparatus which may prevent foreign substances from accumulating on an attachment unit to fix a filter unit to the inside of the clothes treating apparatus.

It will be apparent to those skilled in the art that various modifications and variations can be made in the present application without departing from the spirit or scope of the application. Thus, it is intended that the present application covers the modifications and variations of this application provided they come within the scope of the appended claims and their equivalents.

What is claimed is:

1. A filter assembly for a clothes treating apparatus comprising:
a filter unit including a frame that is configured to be detachably inserted into a discharge duct of the clothes treating apparatus and a filter provided in the frame that is configured to filter air; and
an attachment unit configured to detachably couple the filter unit to the discharge duct,
wherein the attachment unit includes:
a body provided in the frame and configured to rotate to thereby allow coupling between the filter unit and the discharge duct, and
a coupling part located at one side of the body and configured to be selectively coupled to the discharge duct through a through hole that is defined in the frame,
wherein the body defines a body through hole passing through the body, the body through hole being configured to prevent foreign substances from remaining in an inside of the frame between the body and the frame.

2. The filter assembly according to claim 1, wherein the attachment unit further includes a rotary shaft configured to rotatably couple the body to the frame,
wherein the body through hole includes at least one of a lower through hole located between the rotary shaft and the coupling part or an upper through hole located between the rotary shaft and a free end of the body opposite the coupling part.

3. The filter assembly according to claim 2, wherein the filter unit further includes:
an elastic support part configured to apply a force to the body so as to maintain the state of the coupling part inserted into the through hole; and
a handle configured to apply pressure to the free end of the body so as to withdraw the coupling part from the through hole.

4. The filter assembly according to claim 3, wherein the elastic support part includes an elastic body connecting the free end of the body to the handle.

5. The filter assembly according to claim 4, wherein the elastic body defines a support part through hole located between the free end of the body and the handle to provide a moving path for foreign substances.

6. The filter assembly according to claim 2, wherein:
the filter unit further includes a handle configured to rotate the free end of the body to withdraw the coupling part from the through hole; and
the handle is fixed to the free end of the body.

7. The filter assembly according to claim 1, wherein the frame includes a second through hole located above the through hole to communicate the inside of the frame with an outside of the frame.

8. The filter assembly according to claim 1, wherein the filter unit further includes a scraper provided within the frame and configured to reciprocate within the filter unit to thereby separate foreign substances remaining on an interior surface of the filter from the filter.

9. The filter assembly according to claim 8, wherein the attachment unit is located within a rotation region of the scraper.

10. A clothes treating apparatus comprising:
a reception unit configured to receive clothes;
a discharge duct configured to guide air coming from an interior of the reception unit to an outside of the reception unit;
a filter unit including a frame that is configured to be detachably inserted into the discharge duct and a filter provided in the frame that is configured to filter air; and
an attachment unit configured to detachably couple the filter unit to the discharge duct,
wherein the attachment unit includes:
a body provided in the frame and configured to rotate to thereby allow coupling between the filter unit and the discharge duct, and
a coupling part located at one side of the body and configured to be selectively coupled to the discharge duct through a through hole that is defined in the frame,
wherein the body defines a body through hole passing through the body, the body through hole being configured to prevent foreign substances from remaining in an inside of the frame between the body and the frame.

11. The clothes treating apparatus according to claim 10, wherein the attachment unit further includes a rotary shaft configured to rotatably couple the body to the frame,
wherein the body through hole includes at least one of a lower through hole located between the rotary shaft and the coupling part or an upper through hole located between the rotary shaft and a free end of the body opposite the coupling part.

12. The clothes treating apparatus according to claim 11, wherein the filter unit further includes:
an elastic support part configured to apply a force to the body so as to maintain the state of the coupling part inserted into the through hole; and
a handle configured to apply pressure to the free end of the body so as to withdraw the coupling part from the through hole.

13. The clothes treating apparatus according to claim 12, wherein the elastic support part includes an elastic body connecting the free end of the body to the handle.

14. The clothes treating apparatus according to claim 13, wherein the elastic body defines a support part through hole located between the free end of the body and the handle to provide a moving path for foreign substances.

15. The clothes treating apparatus according to claim 11, wherein:
the filter unit further includes a handle configured to rotate the free end of the body to withdraw the coupling part from the through hole; and
the handle is fixed to the free end of the body.

16. The clothes treating apparatus according to claim 15, wherein the body includes a bending part located between the rotary shaft and the handle and having a concave shape.

17. The clothes treating apparatus according to claim 10, wherein the frame includes a second through hole located above the through hole to communicate the inside of the frame with an outside of the frame.

18. The clothes treating apparatus according to claim 10, wherein the filter unit further includes a scraper provided within the frame and configured to reciprocate within the filter unit to thereby separate foreign substances remaining on an interior surface of the filter from the filter.

19. The clothes treating apparatus according to claim 18, wherein the attachment unit is located within a rotation region of the scraper.

20. The clothes treating apparatus according to claim 19, further comprising:
- a shaft passing through the frame, the scraper being fixed to the shaft;
- a driven gear fixed to the shaft and located externally of the frame;
- a driving gear located within the discharge duct and configured to couple to and drive the driven gear; and
- a motor located outside of the discharge duct and configured to rotate the driving gear.

* * * * *